(12) United States Patent
Warren, Jr.

(10) Patent No.: US 7,613,088 B2
(45) Date of Patent: Nov. 3, 2009

(54) METHOD AND SYSTEM FOR TIME BASED FILE STORAGE

(75) Inventor: Robert W. Warren, Jr., Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 617 days.

(21) Appl. No.: 10/767,510

(22) Filed: Jan. 28, 2004

(65) Prior Publication Data

US 2005/0162768 A1    Jul. 28, 2005

(51) Int. Cl.
*G11B 7/00* (2006.01)
(52) U.S. Cl. .................................... 369/47.28
(58) Field of Classification Search ............. 369/47.4, 369/59.26, 47.7; 360/48, 77.08
See application file for complete search history.

(56) References Cited

U.S. PATENT DOCUMENTS

| | | | | |
|---|---|---|---|---|
| 5,808,995 A * | 9/1998 | Nakamura et al. | ....... | 369/47.29 |
| 5,896,364 A * | 4/1999 | Okazaki et al. | .......... | 369/275.3 |
| 6,449,111 B1 * | 9/2002 | Kool et al. | ..................... | 360/48 |
| 6,556,365 B2 * | 4/2003 | Satoh | .......................... | 360/48 |
| 6,738,341 B2 * | 5/2004 | Ohata et al. | ............... | 369/275.3 |
| 6,925,526 B2 * | 8/2005 | Hall | .......................... | 711/113 |
| 7,046,476 B1 * | 5/2006 | Albrecht et al. | .......... | 360/77.02 |
| 7,054,249 B2 * | 5/2006 | Okada | ...................... | 369/53.11 |
| 7,083,448 B2 * | 8/2006 | Tanigawa | ..................... | 439/160 |
| 7,089,448 B2 * | 8/2006 | Hinshaw et al. | ................. | 714/6 |
| 2003/0012110 A1 * | 1/2003 | Senshu | ..................... | 369/59.13 |
| 2003/0151840 A1 * | 8/2003 | Dunn et al. | .................... | 360/48 |
| 2004/0240095 A1 * | 12/2004 | Igari | ............................ | 360/60 |

\* cited by examiner

*Primary Examiner*—Peter Vincent Agustin
(74) *Attorney, Agent, or Firm*—David K. Lucente (57) ABSTRACT

A method and system for interleaving storage of data streams on a rotating storage medium of a data storage device comprise dividing the storage medium into a plurality of logical zones. Each logical zone of the plurality of logical zones extends radially from an inner diameter of the storage medium to an outer diameter of the storage medium. Data from a first stream of data is written to a first logical zone of the plurality of logical zones for up to an amount of time corresponding to the rotational speed of the storage medium and the size of the first logical zone.

24 Claims, 8 Drawing Sheets

METHOD AND SYSTEM FOR TIME BASED FILE STORAGE

FIELD OF THE INVENTION

This application relates generally to storage and retrieval of information on a data storage device and more particularly to interleaving of information on a storage medium based on an amount of time.

BACKGROUND OF THE INVENTION

A data storage device such as a magnetic, optical, or magneto-optical drive includes a rotating storage medium. For example, modern disc drives comprise one or more rigid discs that are coated with a magnetically changeable medium and mounted on the hub of a spindle motor for rotation at a constant speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors.

Typically, a stream of data, such as streaming audio or video, is saved on a storage medium of a data storage device such as a disc drive in a Digital Video Recorder (DVR) by writing the data in the stream to the storage medium starting at a beginning address and running consecutively along the same track of the medium. If the stream contains more data than can be stored in a single track, data is typically stored in subsequent, concentric tracks on the medium. Other streams may additionally be stored in other concentric series of tracks on the medium such that the series of tracks for two or more streams form a series of concentric bands around the storage medium.

However, storing a plurality of streams or other large volumes of information in such a manner has some drawbacks. First, the compression technique used for the storage and retrieval of this data will effect the time needed for retrieval to be performed. If the user desires a higher degree of compression, the stored data contains less and less of the information required for retrieval of the information in a random access fashion. For example, when compressing video data, an algorithm that achieves a higher degree of compression does so by reducing the ratio of full frames to partial frames. Therefore, the retrieval system must perform a hunting type search of fewer full frames to find the data requested. This hunting type of search will cause an increase in the latency of the device and degradation in performance.

Second, when streams of data are stored in concentric bands of tracks on the storage medium and more than one of the streams are accessed at any one time, a significant amount of head seeking occurs as data is read from or written to one then another stream. For example, a DVR may store more than one movie. A first movie may be stored in a band of tracks near the outside diameter of the storage medium. A second movie may be stored in a second band of tracks inside the first band. As the first movie is replayed or stored, little if any seeking by the heads may occur. However, if the second movie is started for replay or recording by another viewer, the DVR must now read/write both movies. The result is that the heads of the storage device in the DVR will be required to perform many longer seek operations as they switch between the concentric bands of tracks storing the separate movies. This excessive seeking increases power consumption and reduces throughput of the storage device.

This problem is compounded when storing data near the inner diameter of the storage medium. Since less and less data can be stored per track near the inner diameter, a greater number of tracks are required to store data. This greater number of tracks results in a longer physical distance over which the heads must perform the seek operations.

Additionally, tracks near the inner diameter of the storage medium have a significantly lower data transfer rate than the tracks near the outer diameter of the storage medium. Therefore, storing data streams in concentric bands of tracks results in inefficient allocation of the higher data rates available near the outer diameter of the storage medium.

Accordingly there is a need for a file system that arranges data streams on a storage medium to allow very fast access to any random point within the data stream, to minimize head seeking when reading or writing multiple streams, and to uniformly distribute use of the higher data transfer rate at the outer diameter portions of the storage medium. The present invention provides a solution to this and other problems, and offers other advantages over the prior art.

SUMMARY OF THE INVENTION

Against this backdrop the present invention has been developed. According to one embodiment of the present invention, a method of interleaving storage of data streams on a rotating storage medium of a data storage device comprises dividing the storage medium into a plurality of logical zones. Each logical zone of the plurality of logical zones extends radially from an inner diameter of the storage medium to an outer diameter of the storage medium. Data from a first stream of data is written to a first logical zone of the plurality of logical zones for up to an amount of time corresponding to the rotational speed of the storage medium and the size of the first logical zone.

According to another embodiment of the present invention, a data storage device comprises one or more read/write heads, a rotating storage medium accessible by the one or more read/write heads, a processor coupled with the read/write heads to access data on the storage medium, and a memory connected with and readable by the processor. The memory has stored therein instructions that, when executed by the processor, cause the processor to interleave storage of data streams on the rotating storage medium by dividing the storage medium into a plurality of logical zones. Each logical zone of the plurality of logical zones extends radially from an inner diameter of the storage medium to an outer diameter of the storage medium. Data from a first stream of data is written to a first logical zone of the plurality of logical zones for up to an amount of time corresponding to the rotational speed of the storage medium and the size of the first logical zone.

These and various other features as well as advantages which characterize the present invention will be apparent from a reading of the following detailed description and a review of the associated drawings.

DETAILED DESCRIPTION

Embodiments of the present invention will be discussed with reference to a data storage device that, in one embodiment may be a magnetic disc drive such as disc drive 100 illustrated in FIG. 1. One skilled in the art will recognize that the present invention may also be applied to any data storage device, such as an optical disc drive, a magneto-optical disc drive, or other data storage device upon which data may be stored.

Figure 1:
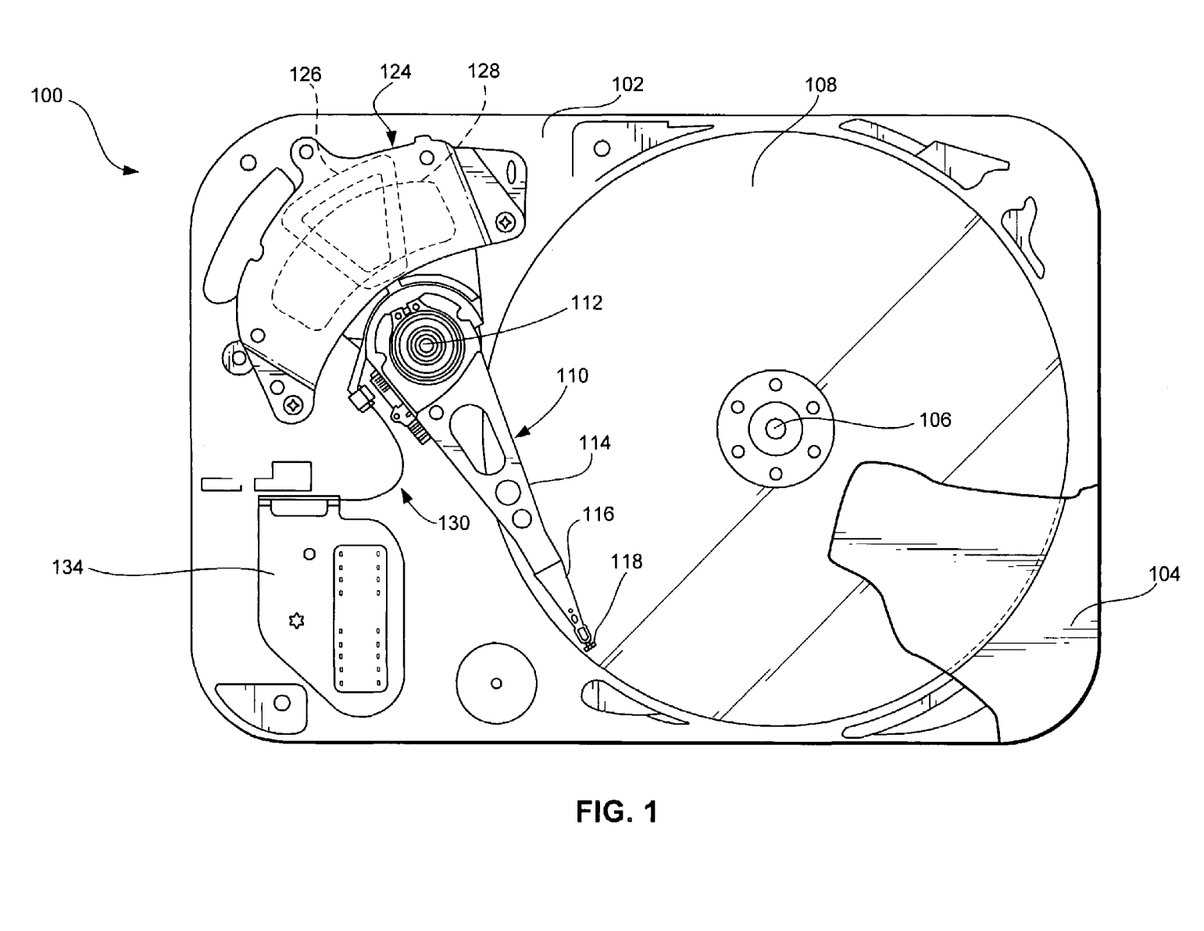
FIG. 1 is a plan view of a disc drive in accordance with an embodiment of the present invention illustrating the primary internal components of the disc drive.

FIG. 1 is a plan view illustrating the primary internal components of a disc drive incorporating one of the various embodiments of the present invention. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved away from portions of the disc 108 containing data when the drive motor is de-energized. The heads 118 are secured over portions of the disc not containing data through the use of an actuator latch arrangement and/or ramp, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly 130 includes a printed circuit board 134 to which a flex cable leading to the head 118 is connected; the flex cable leading to the heads 118 being routed along the actuator arms 114 and the flexures 116 to the heads 118. The printed circuit board 134 typically includes circuitry for controlling the write currents applied to the heads 118 during a write operation and a preamplifier for amplifying read signals generated by the heads 118 during a read operation. The flex assembly terminates at a flex bracket for communication through the base deck 102 to a disc drive printed circuit board (not shown) mounted to the bottom side of the disc drive 100.

Figure 2:
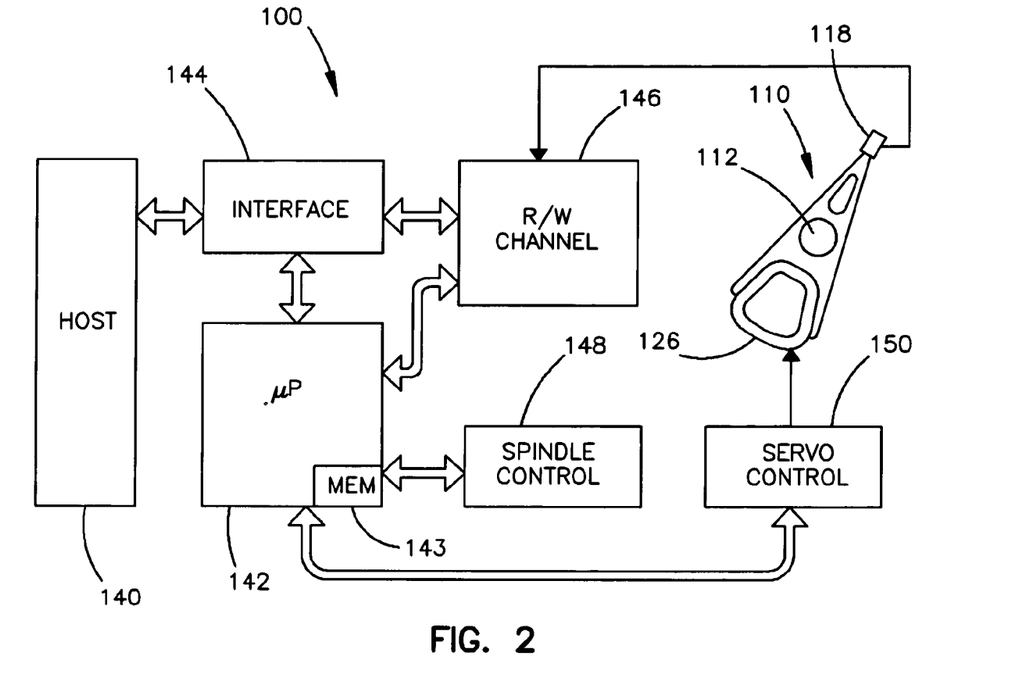
FIG. 2 is a control block diagram for the disc drive shown in FIG. 1 illustrating the primary functional components.

FIG. 2 is a control block diagram for the disc drive 100 illustrating the primary functional components of a disc drive incorporating one of the various embodiments of the present invention and generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM), Dynamic RAM (DRAM), Flash programmable memory (FLASH) and other sources of resident memory for the microprocessor 142. Instructions stored in MEM 143 and executable by the microprocessor 142 may include instructions for arranging information stored on the disc 108 as will be discussed below with reference to FIGS. 4-8.

The discs 108 are rotated at a constant speed by a spindle motor control circuit 148, which typically electrically commutates the spindle motor 106 (FIG. 1) through the use, typically, of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the data storage device 100, read signals are generated by the heads 118 and provided to the read/write channel 146, which performs decoding and error detection and correction operations and outputs the retrieved data to the interface 144 for subsequent transfer to the host computer 140 or other device.

Figure 3:
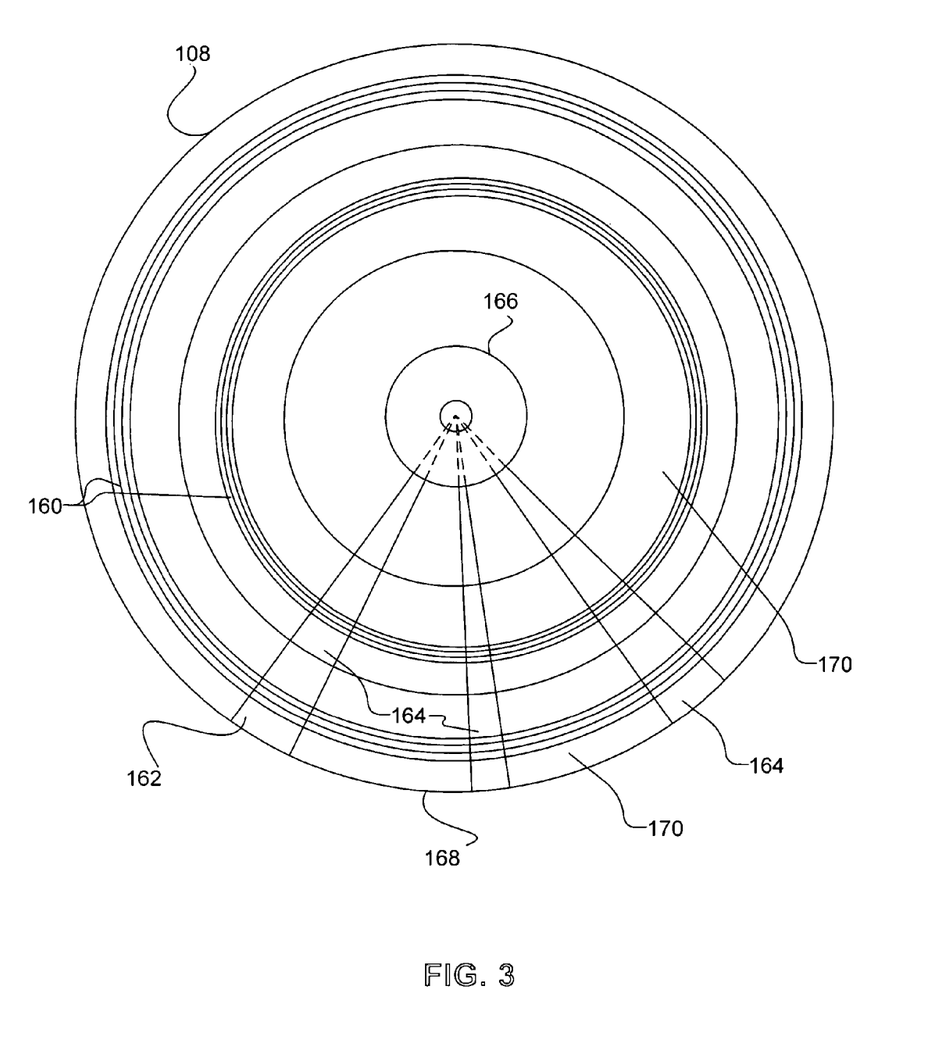
FIG. 3 depicts a plurality of concentric tracks on a disc of the disc drive, illustrating the manner in which data is typically stored on the disc.

FIG. 3 depicts a plurality of concentric tracks on a storage medium such as disc 108 of the disc drive 100, illustrating the manner in which data is typically stored on the disc 108. Shown here is a plan view of the disc 108, generally showing the main components on the surface of the disc 108. The discs 108 are circumferentially divided into a plurality of concentric circular tracks 160. The number of tracks 160 per disc 108 will vary with each particular manufactured disc 108. A one-time revolution (INDEX) around each track 160 is typically indicated by an index mark 162 that extends the radius of the disc 108. The tracks 160 are in groups, called zones 170, in which the recording frequency is substantially the same among the tracks 160.

The disc 108 is cicumferentially divided into a plurality of spaced arcuate servo segments 164 with regions for data in between. Typically, the servo segments 164 begin near the inner edge 166 of the annular disc 108 and terminate near the outer edge 168 of the disc 108. As with the number of tracks 160 per disc 108, the number of servo segments 164 per disc 108 varies with each particular manufactured disc 108. Each track 160 is composed of spaced servo segments 164 with data sectors between the servo segments 164.

Figure 4:
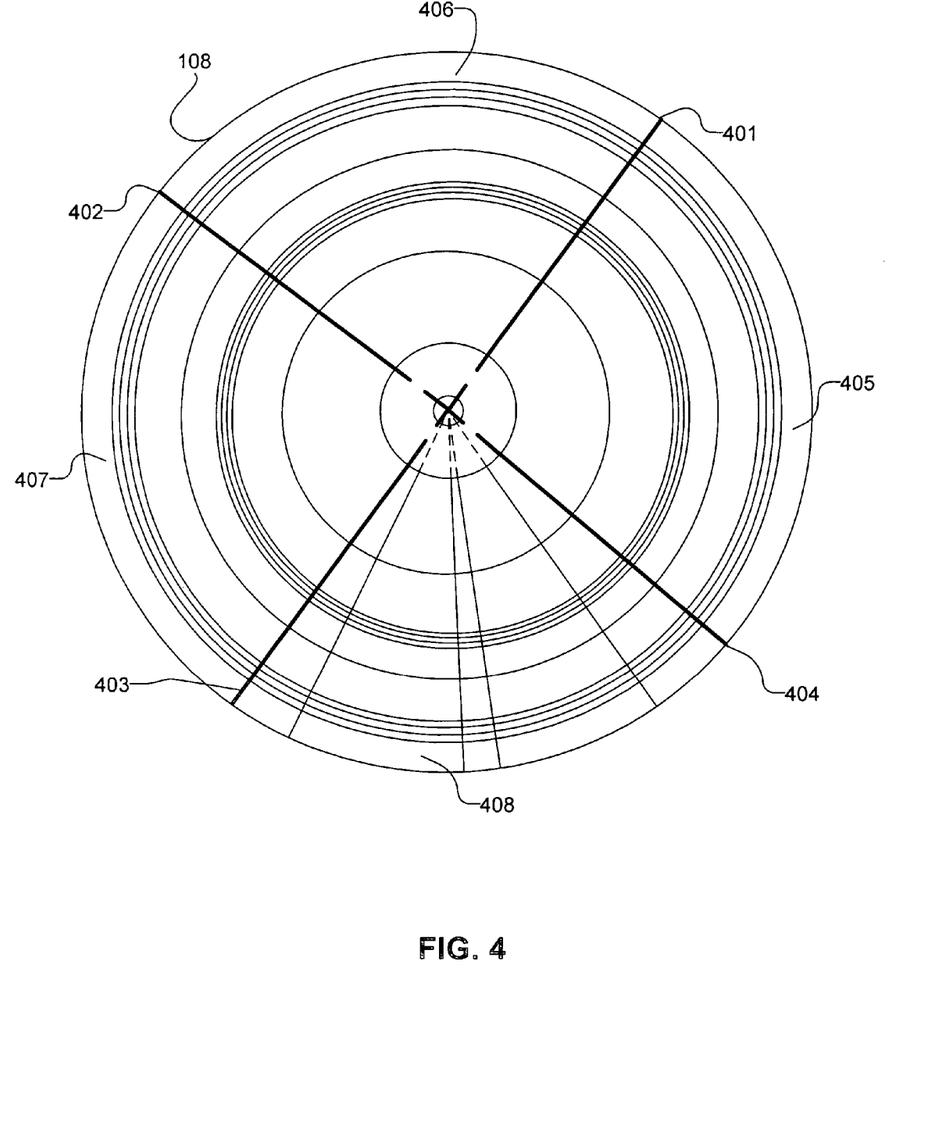
FIG. 4 illustrates the disc as illustrated in FIG. 3 where the disc has been divided into a number of arcuate logical zones according to one embodiment of the present invention.

FIG. 4 illustrates the disc 108 as illustrated in FIG. 3 where the disc 108 has been segmented arcuately into a number of logical zones 405-408 according to one embodiment of the present invention. This example includes a number of lines 401-404 extending radially from the inner diameter to the outer diameter of the disc 108. These lines 401-404 represent division of the storage media into a plurality of logical zones 405-408, each of the wedge-like logical zones 405-408 extending radially from an inner diameter of the storage medium to an outer diameter of the storage medium. For example, one logical zone 406 is represented between line 401 and line 402. Another logical zone 407 is represented between line 402 and line 403 and so on. The logical divisions represented by lines 401-404 may be conveniently but not necessarily aligned with servo sectors on the storage medium.

One skilled in the art will understand that more or fewer logical zones may be located on the storage medium Four zones are shown for illustrative purposes only. Additionally, the size or storage capacity of the storage medium has little impact on the size or number of the logical zones. Further, the size of the logical zones, while shown here to be uniform, need not be uniform. That is, each logical zone may be of a different size if the size of each zone is known.

Each logical zone 405-408 relates to, or accommodates, a known amount of real time. That is, since the disc is spinning with a constant rotational speed, the distance on the surface of the disc between the lines 401-404 representing the logical divisions moves past the read/write heads in a predictable amount of time. According to one embodiment of the present invention, this amount of time serves as the basis for determining the location of the logical zones for reading from and writing to the data storage device as will be described further below.

In use, data from a first stream of data may be written to a first logical zone such as logical zone 405. According to one embodiment, data may be written into each logical zone starting at the outer diameter of the storage medium and progressing toward the inner diameter of the storage medium. Therefore, as the first data stream is written to the storage medium of the data storage device, data from the stream is written to concentric tracks of the storage medium but within the bounds of the first logical zone 405. As introduced above, the bounds of the first logical zone 405 can be determined based on the known time for the zone to rotate past the read/write head.

Further, data from a second stream of data may be written to a second logical zone such as logical zone 406. As with data from the first stream, data from the second stream is written to concentric tracks of the storage medium but within the bounds of the second logical zone 406 determined based on the known time for the zone to rotate past the read/write head.

Additionally, a single stream need not be confined to a single logical zone. That is, data from the first stream may be placed in the first logical zone such as logical zone 405 and a third logical zone such as logical zone 407. Data from the second stream may be placed in the second logical zone such as logical zone 406 and a fourth logical zone 408. In this way, data from the two streams will be interleaved around the storage medium on the basis of the time for each logical zone to rotate past the read/write heads. Of course, if a greater number of logical zones are used, a wider variety of arrangements become possible.

By writing data from each stream in one or more logical zones as illustrated, the streams are interleaved with each other around the storage medium rather than stored in concentric bands of tracks. As a result, the average distance that the heads may need to seek is reduced. Additionally, all streams share the higher data rate outer diameter of the storage medium as well as the lower data rate inner diameter. Therefore, the data rate is averaged across all streams rather then relegating later streams to the lower data rate inner diameter of the storage medium.

Figure 5:
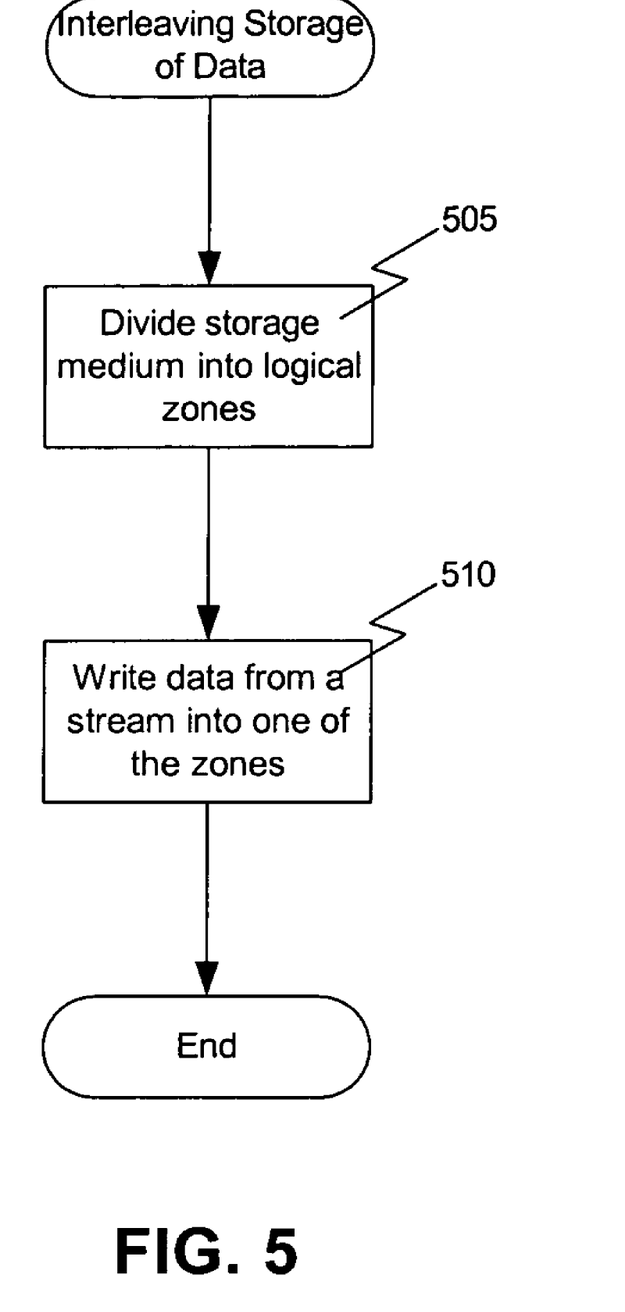
FIG. 5 is a flowchart illustrating interleaving storage of data streams on a storage medium according to one embodiment of the present invention.

FIG. 5 is a flowchart illustrating interleaving storage of data streams on a storage medium according to one embodiment of the present invention. Here processing begins with divide operation 505. Divide operation 505 comprises dividing the storage medium into a plurality of logical zones. As illustrated above in FIG. 4, each logical zone of the plurality of logical zones extends radially from the inner diameter of the storage medium to the outer diameter of the storage medium. Additional details of dividing the storage medium into logical zones will be discussed below with reference to FIG. 6. Control then passes to write operation 510.

Write operation 510 comprises writing data from a first stream of data to a first logical zone of the plurality of logical zones for up to an amount of time corresponding to a rotational speed of the storage medium and a size of the first logical zone. That is, data from a first stream of data is written into the first logical zone and within the bounds of the first logical zone based on the known time for the zone to rotate past the read/write head. Additionally, as discussed above, write operation 510 may comprise writing data from a second stream of data in a second logical zone of the plurality of logical zones for up to an amount of time corresponding to the rotational speed of the storage medium and the size of the second logical zone. Details of writing data to the storage medium will be discussed further below with reference to FIG. 7.

Figure 6:
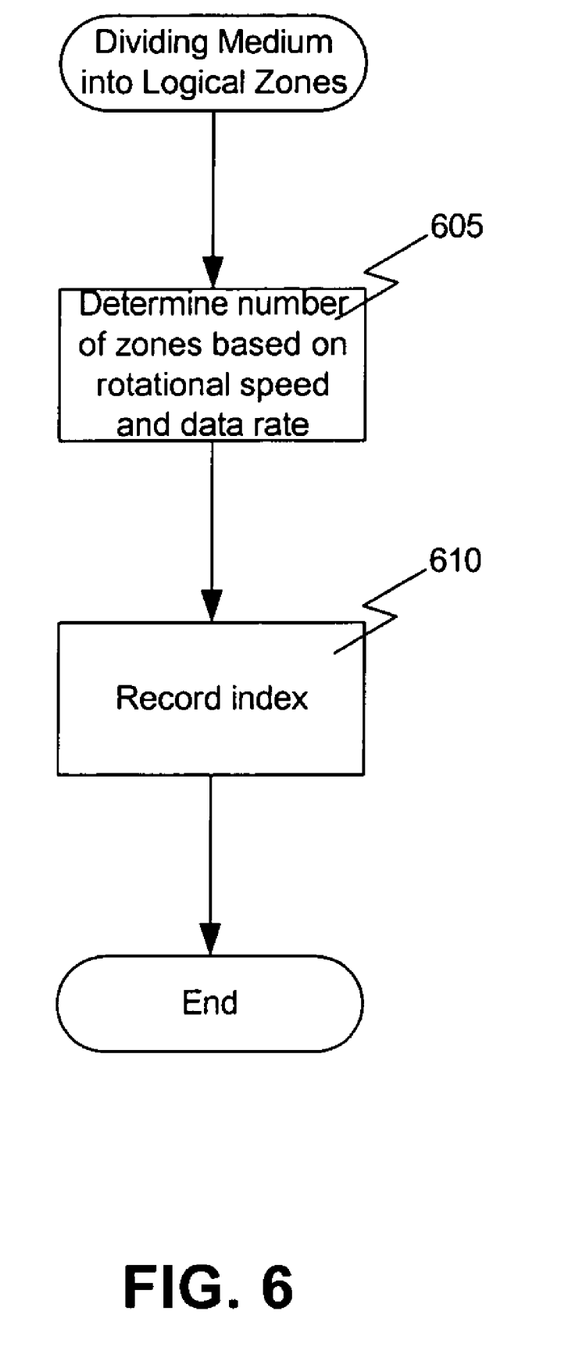
FIG. 6 is a flowchart illustrating dividing a storage medium into a plurality of logical zones according to the embodiment illustrated in FIG. 5.

FIG. 6 is a flowchart illustrating dividing a storage medium into a plurality of logical zones according to the embodiment illustrated in FIG. 5. Processing begins with determination operation 605. Determination operation 605 comprises determining a number of logical zones based on a rotational speed of the storage medium and an output data rate. That is, the number of logical zones on the storage medium may be based on the rotational speed of the storage medium and the expected output data rate that should be supported by the data storage device. For example, a storage medium rotating at 7200 revolutions per minute (120 revolutions per second) may be expected to provide real-time streaming video at 30 frames per second. Therefore, 120 revolutions per second divided by 30 frames per second equals 4 frames per revolution. In other words, the storage medium may be conveniently divided into 4 logical zones while still supporting the expected output data rate.

Alternatively, determination of the number of logical zones may be based on the data transfer rate of the data storage device and the expected output data rate that should be supported by the data storage device. For example, a device capable of providing data at a rate of 100 mbps that is expected to provide real-time data at 10 mbps may be conveniently divided into 10 logical zones while still supporting the expected output data rate. Control then passes to record operation 610.

Record operation 610 comprises recording an index for at least the beginning of the first logical zone. For example, an address mark or other indication on the storage medium may be recorded. Alternatively, a timer may be initiated to count the rotation of the storage medium. Since the rotational speed of a data storage device is extremely uniform, a time based counter may be used to accurately estimate the current position of the storage medium.

Figure 7:
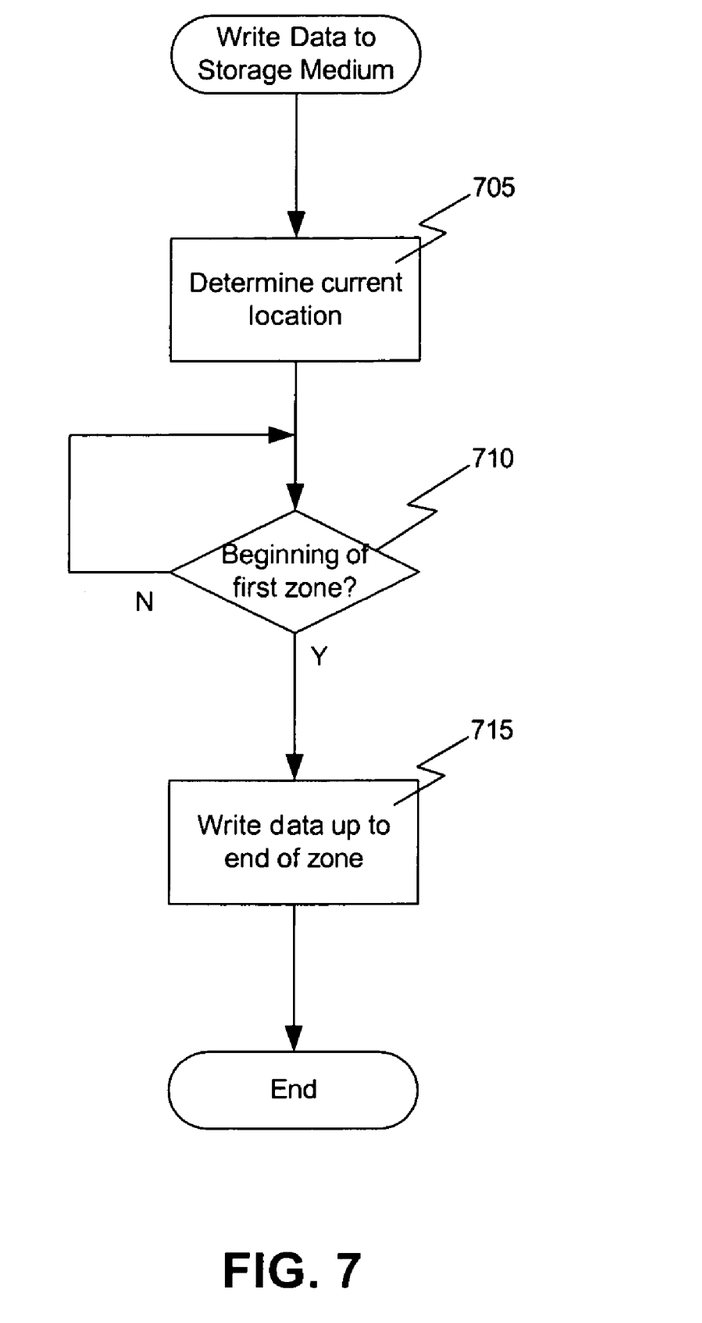
FIG. 7 is a flowchart illustrating writing data from a stream to a logical zone according to the embodiment illustrated in FIG. 5.

FIG. 7 is a flowchart illustrating writing data from a stream to a logical zone according to the embodiment illustrated in FIG. 5. Here, operation begins with determination operation 705. Determination operation 705 comprises determining a current location on the storage medium. According to one embodiment, the current position may be based on a counter of timer ticks initiated at an index position. Since the rotational speed of a data storage device is extremely uniform, time may be used to accurately estimate the current position of the storage medium. Alternatively, the position may be determined by reading address marks or other indications of position from the storage medium. Control then passes to query operation 710.

Query operation 710 comprises determining whether the current location is a beginning of the first logical zone. That is, the current position is compared to the known position of the first logical zone determined when the storage medium was divided into logical zones. If the current location is not the beginning of the first logical zone, control passes to wait for the storage medium to rotate to the beginning of the first logical zone. Once the beginning of the first logical zone is reached, control passes to write operation 715.

Write operation 715 comprises writing the data from the first stream of data to the storage medium for up to the end of the logical zone. Writing data from a first stream of data to a first logical zone of the plurality of logical zones may start at an outer diameter of the storage medium and progress toward an inner diameter of the storage medium. According to one embodiment, data may be written for an amount of time corresponding the time for the storage medium to rotate through one logical zone. Alternatively, other indications of the end of the logical zone may be used such as address marks on the storage medium.

Figure 8:
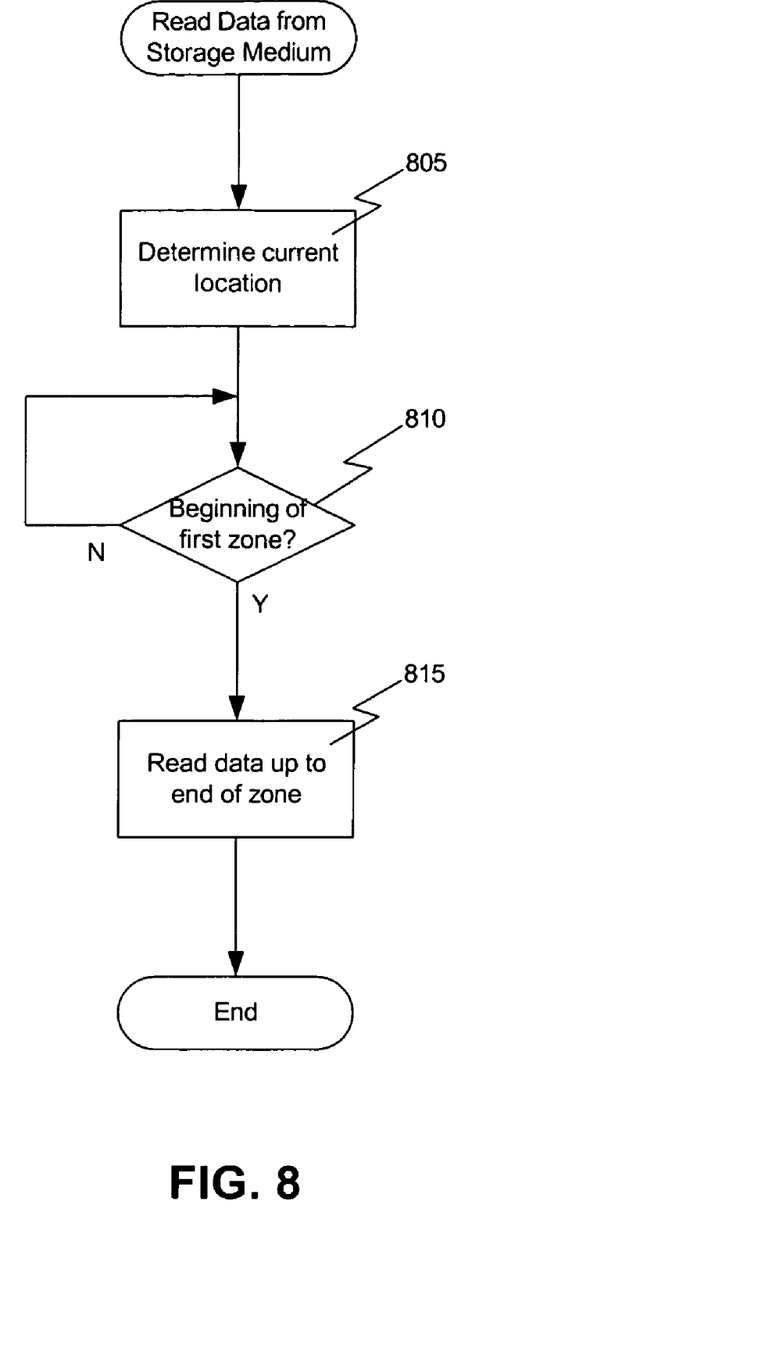
FIG. 8 is a flowchart illustrating reading data from a logical zone according to the embodiment illustrated in FIG. 5.

FIG. 8 is a flowchart illustrating reading data from a logical zone according to the embodiment illustrated in FIG. 5. Operation begins with determination operation 805. Determination operation 805 comprises determining a current location on the storage medium. According to one embodiment, the current position may be based on a counter of timer ticks initiated at an index position. Since the rotational speed of a data storage device is extremely uniform, time may be used to accurately estimate the current position of the storage medium. Alternatively, the position may be determined by reading address marks or other indications of position from the storage medium. Control then passes to query operation 810.

Query operation 810 comprises determining whether the current location is a beginning of the first logical zone. That is, the current position is compared to the known position of the first logical zone determined when the storage medium was divided into logical zones. If the current location is not the beginning of the first logical zone, control passes to wait for the storage medium to rotate to the beginning of the first logical zone. Once the beginning of the first logical zone is reached, control passes to write operation 815.

Read operation 815 comprises reading the data from the first stream of data to the storage medium for up to the end of the logical zone. Reading data from a first stream of data to a first logical zone of the plurality of logical zones may start at an outer diameter of the storage medium and progress toward an inner diameter of the storage medium. According to one embodiment, data may be read for an amount of time corresponding to the time for the storage medium to rotate through one logical zone. Alternatively, other indications of the end of the logical zone may be used such as address marks on the storage medium.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, various numbers and arrangements of logical zones may be used. Additionally, various arrangements for interleaving data using the logical zones may also be used. Numerous other changes may be made which will readily suggest themselves to those skilled in the art and which are encompassed in the spirit of the invention disclosed and as defined in the appended claims.

What is claimed is:

1. A method comprising:
   dividing a storage medium into a plurality of logical zones, the storage medium having an inner diameter and an outer diameter, each logical zone extending radially from the inner diameter to the outer diameter; and
   progressively writing data from a first stream of data to concentric tracks of the storage medium, each track being written from a first boundary of a first logical zone to a second boundary of the first logical zone, within the boundaries of the first logical zone of the plurality of logical zones.

2. The method of claim 1, wherein dividing the storage medium into a plurality of logical zones comprises determining a number of logical zones based on a rotational speed of the storage medium and an output data rate.

3. The method of claim 1, wherein dividing the storage medium into a plurality of logical zones comprises determining a number of logical zones based on a data transfer rate of a data storage device and an expected output data rate supported by the data storage device.

4. The method of claim 1, further comprising recording an index for at least the beginning of the first logical zone.

5. The method of claim 1, further comprising prior to writing data from a first stream of data to a first logical zone of the plurality of logical zones:
   determining a current location on the storage medium;
   determining whether the current location is a beginning of the first logical zone; and
   responsive to determining that the current location is not the beginning of the first logical zone, waiting for the storage medium to rotate to the beginning of the first logical zone.

6. The method of claim 5, wherein writing data from a first stream of data to a first logical zone of the plurality of logical zones comprises writing data starting at an outer diameter of the storage medium and progressing toward an inner diameter of the storage medium.

7. The method of claim 1, further comprising writing data from a second stream of data in a second logical zone of the plurality of logical zones for up to an end of the second logical zone.

8. The method of claim 1, further comprising:
determining a current location on the storage medium;
determining whether the current location is a beginning of the first logical zone, and responsive to determining that the current location is not the beginning of the first logical zone, waiting for the storage medium to rotate to the beginning of the first logical zone; and
reading the data from the first stream of data to the storage medium for up to an amount of time corresponding to a rotational speed of the storage medium and size of the first logical zone.

9. Apparatus comprising:
a rotating storage medium having an inner diameter and an outer diameter and being divided into a plurality of logical zones, each logical zone extending radially from the inner diameter to the outer diameter;
a read/write head positioned to access data on the storage medium, the read/write head progressively writing data from a first stream of data to concentric tracks of the storage medium, each track being written from a first boundary of a first logical zone to a second boundary of the first logical zone, within the boundaries of first logical zone of the plurality of logical zones.

10. The apparatus of claim 9, wherein a number of logical zones into which the rotating storage medium is divided is determined based on a rotational speed of the storage medium and an output data rate.

11. The apparatus of claim 9, wherein a number of logical zones into which the rotating storage medium is divided is determined based on a data transfer rate of a data storage device and an expected output data rate supported by the data storage device.

12. The apparatus of claim 9, further comprising
recording an index recorded on the rotating storage medium for at least the beginning of the first logical zone.

13. The apparatus of claim 9, wherein, prior to writing data from the first stream of data to the first logical zone of the plurality of logical zones, the read/write head determines a current location of the read/write head is a beginning of the first logical zone and waits for the storage medium to rotate to the beginning of the first logical zone before writing, if the current location is not the beginning of the first logical zone.

14. The apparatus of claim 13, wherein the read/write head writes data starting at the outer diameter of the storage medium and progressing toward the inner diameter of the storage medium.

15. The apparatus of claim 9, wherein the read/write head further writes data from a second stream of data in a second logical zone of the plurality of logical zones for up to an end of the second logical zone.

16. The apparatus of claim 9, wherein the read/write head determines whether a current location of the read/write head is a beginning of the first logical zone; waits for the storage medium to rotate to the beginning of the first logical zone, if the current location is not the beginning of the first location zone; and reads the data from the first stream of data to the storage medium for up to an amount of time corresponding to a rotational speed of the storage medium and size of the first logical zone.

17. A computer readable medium having stored thereon a series of instructions that, when executed by a processor, cause the processor to interleave storage of data streams on a rotating storage medium of a data storage device by:
dividing the storage medium into a plurality of logical zones, the storage medium having an inner diameter and an outer diameter, each logical zone of the plurality of logical zones extending radially from an inner diameter of the storage medium to an outer diameter of the storage medium; and
progressively writing data from a first stream of data to concentric tracks of the storage medium, each track being written from a first boundary of a first logical zone to a second boundary of the first logical zone, within the boundaries of first logical zone of the plurality of logical zones.

18. The computer readable medium of claim 17, wherein dividing the storage medium into a plurality of logical zones comprises determining a number of logical zones based on a rotational speed of the storage medium and an output data rate.

19. The computer readable medium of claim 17, wherein dividing the storage medium into a plurality of logical zones comprises determining a number of logical zones based on a data transfer rate of a data storage device and an expected output data rate supported by the data storage device.

20. The computer readable medium of claim 17, further comprising recording an index for at least the beginning of the first logical zone.

21. The computer readable medium of claim 17, further comprising prior to writing data from a first stream of data to a first logical zone of the plurality of logical zones:
determining a current location on the storage medium;
determining whether the current location is a beginning of the first logical zone; and
responsive to determining that the current location is not the beginning of the first logical zone, waiting for the storage medium to rotate to the beginning of the first logical zone.

22. The computer readable medium of claim 21, wherein writing data from a first stream of data to a first logical zone of the plurality of logical zones comprises writing data starting at an outer diameter of the storage medium and progressing toward an inner diameter of the storage medium.

23. The computer readable medium of claim 17, further comprising writing data from a second stream of data in a second logical zone of the plurality of logical zones for up to an end of the second logical zone.

24. The computer readable medium of claim 17, further comprising:
determining a current location on the storage medium;
determining whether the current location is a beginning of the first logical zone, and responsive to determining that the current location is not the beginning of the first logical zone, waiting for the storage medium to rotate to the beginning of the first logical zone; and
reading the data from the first stream of data to the storage medium for up to an amount of time corresponding to a rotational speed of the storage medium and size of the first logical zone.

* * * * *

UNITED STATES PATENT AND TRADEMARK OFFICE
CERTIFICATE OF CORRECTION

PATENT NO. : 7,613,088 B2  Page 1 of 1
APPLICATION NO. : 10/767510
DATED : November 3, 2009
INVENTOR(S) : Robert W. Warren, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Nineteenth Day of October, 2010

David J. Kappos
*Director of the United States Patent and Trademark Office*